US007128432B1

United States Patent
Stern et al.

(12) United States Patent
(10) Patent No.: US 7,128,432 B1
(45) Date of Patent: Oct. 31, 2006

(54) BACKLIGHTED DISPLAY ASSEMBLY FOR AN LCD

(75) Inventors: Michael S. Stern, Maple Grove, MN (US); Mark A. Sletten, Crystal, MN (US)

(73) Assignee: Sauer-Danfoss Inc., Minneapolis, MN (US)

( * ) Notice: Subject to any disclaimer, the term of this patent is extended or adjusted under 35 U.S.C. 154(b) by 123 days.

(21) Appl. No.: 10/935,363

(22) Filed: Sep. 7, 2004

(51) Int. Cl.
*G01D 11/28* (2006.01)
(52) U.S. Cl. .......................... 362/30; 362/631
(58) Field of Classification Search ............... 362/555, 362/561, 609, 613, 623, 29, 30, 85, 612, 362/631
See application file for complete search history.

(56) References Cited

U.S. PATENT DOCUMENTS

| 6,354,714 B1 | 3/2002 | Rhodes |
| 6,598,987 B1* | 7/2003 | Parikka ........................ 362/26 |
| 6,677,936 B1 | 1/2004 | Jacobsen et al. |
| 6,942,374 B1* | 9/2005 | Lee ............................. 362/615 |
| 2002/0158823 A1 | 10/2002 | Zavracky et al. |
| 2002/0175632 A1 | 11/2002 | Takeguchi |
| 2004/0012531 A1 | 1/2004 | Ishii |
| 2004/0061810 A1 | 4/2004 | Lowery et al. |
| 2004/0085660 A1 | 5/2004 | Hara |

* cited by examiner

*Primary Examiner*—Renee Luebke
*Assistant Examiner*—Zahra I. Bennett

(57) ABSTRACT

A backlighting display assembly for an LCD that utilizes a plurality of LEDs that are in spaced relation adjacent to the LCD such that the LEDs do not directly light the LCD and instead a reflective material such as a potted material is placed in parallel spaced alignment from the LCD and LEDs such that light is reflected off of the reflected surface to illuminate the interior LCD and open target areas of the circuit board of the assembly thus providing proper lighting for the LCD, transparent and semi-transparent areas of the graphic overlay of the control panel.

3 Claims, 2 Drawing Sheets

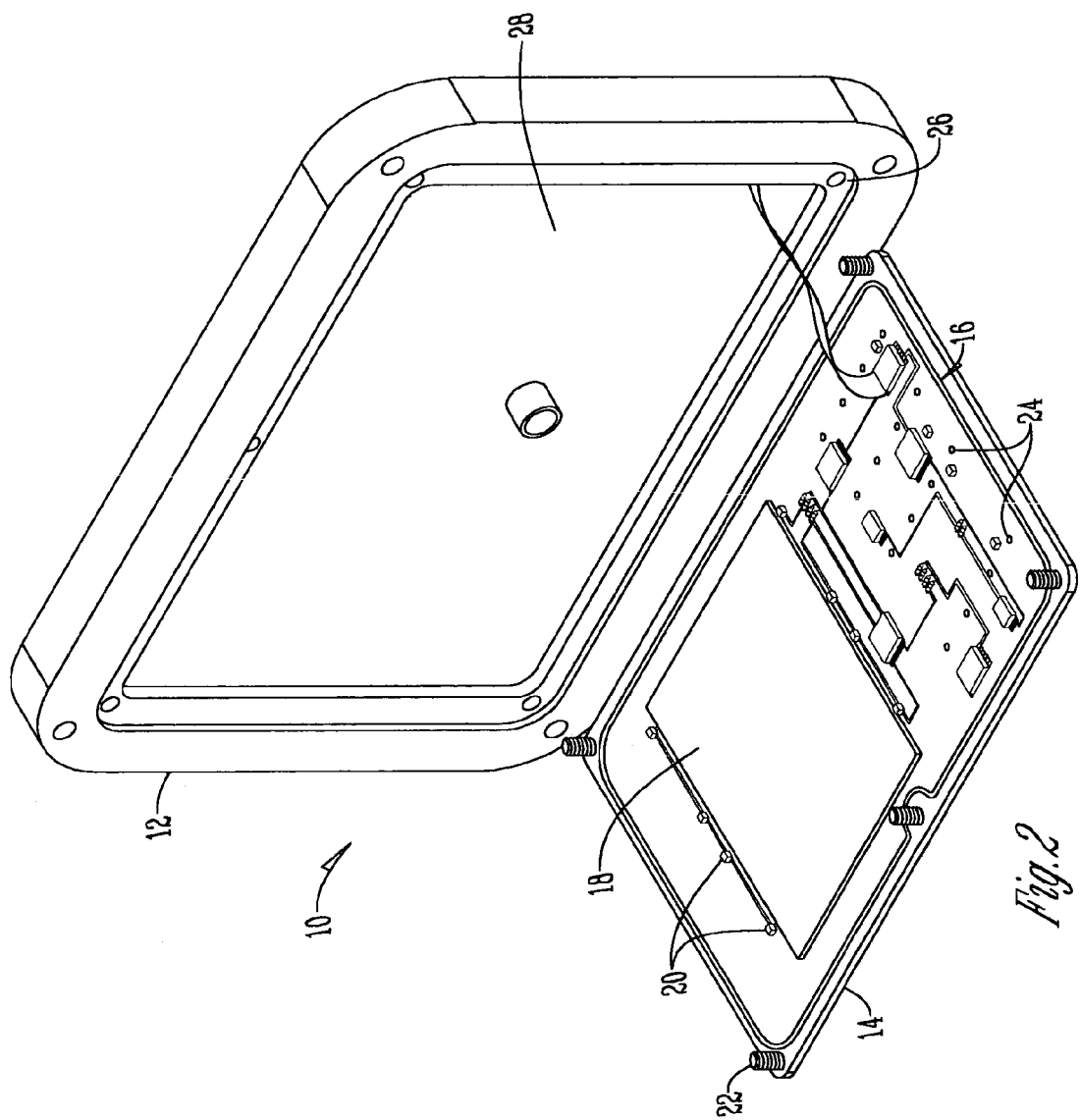

BACKLIGHTED DISPLAY ASSEMBLY FOR AN LCD

BACKGROUND OF THE INVENTION

The present invention relates to the field of back lighting for an LCD (liquid crystal display) and/or graphical images on a transparent or semi-transparent graphic overlay. In a display application using an LCD and target areas on a graphic overlay of a control panel, sufficient backlight is needed. Standard display assemblies include the use of a circuit board and LCD on a control panel wherein the panel fits into a frame. Currently in the art, to provide proper backlighting to the entire backside of the control panel including the circuit board, a single diffused backlight is placed over the LCD. This large diffused backlight is very expensive and not cost economical. Additionally, this large backlight consumes a considerable amount of printed circuit board area thus limiting the usable area of the circuit board.

Also known in the art is the use of LEDs (light emitting diodes) that are mounted to shine directly on the LCD. However, this solution provides a backlight that is not esthetically pleasing and that additionally creates hot spots on the LCD because the LEDs do not evenly diffuse to provide the sufficient backlighting needed in this application. Additionally, these direct shine through or reverse mount LEDs tend to bleed out the viewable segments on the graphic overlay due to the limitations of the viewing angle and the short distance to the LCD. Consequently, there is a need in the art for a backlighting system that will provide sufficient backlighting for an LCD and target areas of a graphic overlay that is esthetically pleasing and economical to produce.

Thus, it is a primary object of the present invention to provide a backlighted display assembly in combination with a reflective surface in order to backlight an LCD and areas of a graphic overlay that are transparent or semi-transparent in nature.

Yet another object of the present invention is to provide LEDs in spaced apart relation to fully illuminate an LCD and graphic overlay to maximize the use of the circuit board.

Another object of the present invention is to use a sealing potted material to reflect light in order to diffuse the light spatially along the LCD and graphic overlay without creating "hot spots" or LED bleeding. These and other objects, features, or advantages of the present invention will become apparent from the specification and claims.

BRIEF SUMMARY OF THE INVENTION

The present invention is a backlighted display assembly that provides sufficient backlight to illuminate an LCD and target areas of the graphic overlay that are transparent or semi-transparent in nature. The backlighted assembly has a circuit board that is electrically connected to a plurality of LEDs. The LEDs surround an LCD in spaced relation. The circuit board and LCD are on the backside of a control panel having a graphic overlay that fits into a frame. A reflective potting material seals off the interior of the frame and allows for material that will reflect the light produced by the LEDs in order to illuminate the entire LCD and circuit board area.

BRIEF DESCRIPTION OF THE DRAWINGS

FIG. 2 is a plan view of the opened backlight display assembly.

DESCRIPTION OF THE PREFERRED EMBODIMENTS

Figure 1:
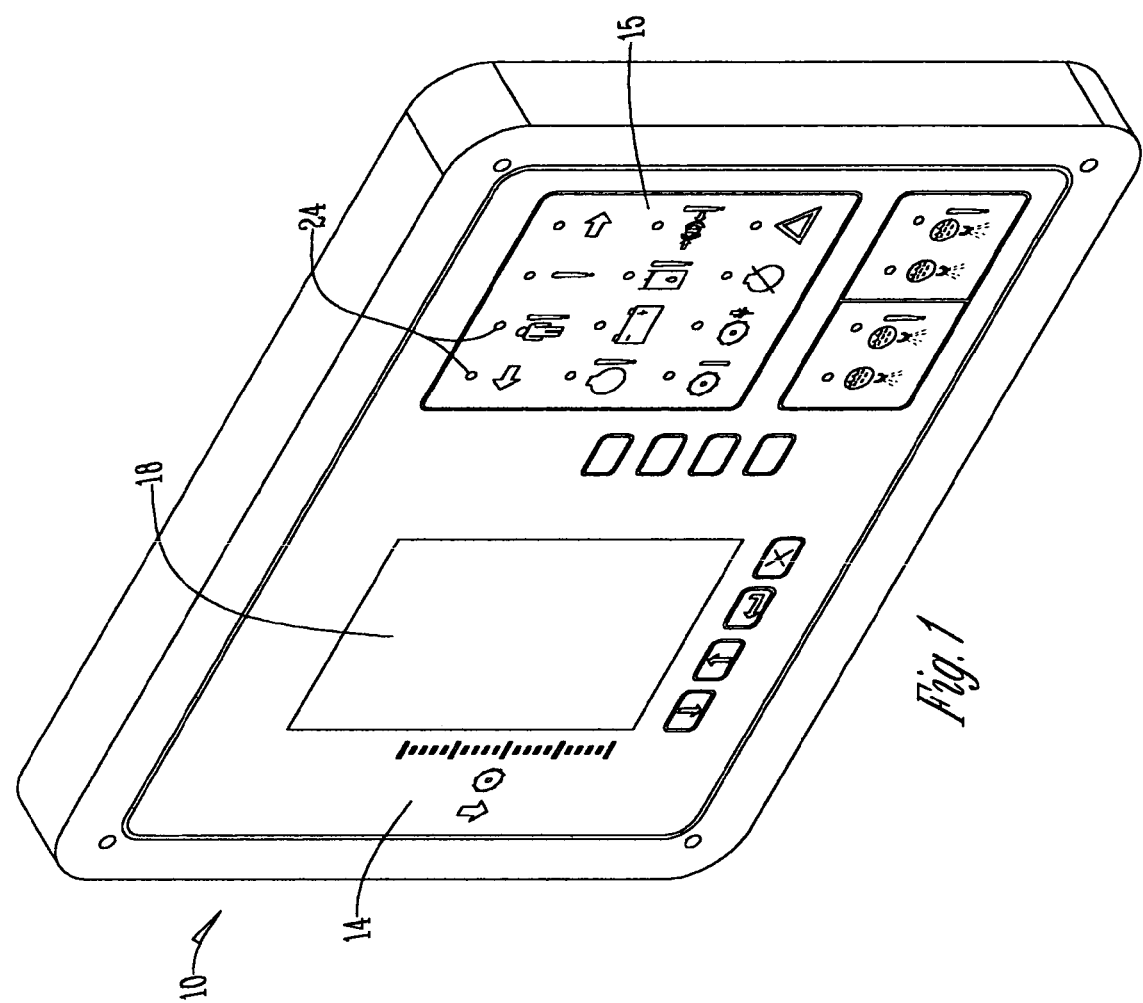
FIG. 1 is perspective view of the closed backlight display assembly.

The figures show the backlighted display assembly 10 of the present invention. The assembly 10 is comprised of two separate parts, a frame 12 and a control panel 14 with a graphic overlay 15 (FIG. 1) that matingly fits within and is secured to the frame 12. The control panel 14 has a circuit board 16 that is printed on the panel and controls all aspects of the assembly 10. Additionally, on panel 14 is an LCD (liquid crystal display) 18 that is electrically connected to the circuit board such that information on the LCD can be displayed. Additionally, on the circuit board are a plurality of LEDs (light emitting diodes) 20 in spaced relation adjacent the LCD 18 that are electrically connected to the circuit board 16 and that provide the backlighting for the backlighting system 10. The control panel 14 has securing means 22 that is preferably in the form of a bolt or a screw that secures the panel 14 to the frame 12. The circuit board 16 is powered by any traditional means including the use of a battery or an electrical outlet. On the opposite side of the control panel 14 is a graphic overlay 15 that is associated with the circuit board 16 to alert a user of different warnings by the lighting of target areas 24.

The frame 12 of the assembly 10 has openings 26 therein for receiving the securing means 22 of the control panel 14. The interior of the frame 12 is lined with a reflective surface 28 positioned in parallel spaced alignment from the LCD 18 and circuit board 16 such that light from the LEDs 20 can be reflected off the reflective surface 28 and onto the LCD 18 and circuit board 16. In a preferred embodiment the reflective surface 28 is a potted surface.

In operation, when the circuit board 16 is turned on, it activates the LEDs 20. Because the LEDs 20 are placed adjacent to the LCD 18, light does not directly illuminate the LCD 18 or the open target areas of the circuit board 16. Instead, the light from the LEDs 20 hits the reflective surface 28 allowing the light to diffuse within the assembly 10 thus illuminating both the LCD 18 and the circuit board 16. Therefore, there is sufficient backlight for the LCD 18 and the transparent and/or semi-transparent target areas 24 of the graphic overlay 15 to provide an esthetically pleasing backlight. Additionally, because the plurality of LEDs 20 reflects off the reflective surface 28 and does not directly light the LCD 18, hot spots are avoided and the LCD and graphic images do not bleed. Also, one skilled in the art will appreciate that the LEDS 20 are placed in spaced relation in such a way to allow for light to be reflected off the reflective surface 28 and be diffused evenly over the entire interior of the assembly 10 including the LCD 18 and the circuit board 16 to fully illuminate both. Consequently, all of the objectives of the present invention have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A backlight display assembly having an interior comprising:

a circuit board having a plurality of target areas;

a plurality of LEDs electrically connected to the circuit board;

an LCD adjacent to the LEDS and electrically connected to the circuit board;

a reflective surface positioned in parallel spaced alignment from the LCD such that light from the LEDs is reflected off the reflective surface and onto the LCD and circuit board;

wherein the LEDs are placed in spaced relation such that light is diffused evenly over the interior of the assembly including the LCD and circuit board to provide backlighting to the open target areas of the circuit board; and wherein the open target areas of the circuit board are within a graphic overlay.

2. The backlighted display assembly of claim 1 wherein the reflective surface is a potted surface.

3. The backlighted display assembly of claim 1 wherein the plurality of LEDs are aligned in parallel spaced relation to illuminate the circuit board.

* * * * *